United States Patent [19]

Muto

[11] Patent Number: 4,566,189
[45] Date of Patent: Jan. 28, 1986

[54] FILAMENT-TYPE TRIMMING APPARATUS

[76] Inventor: Goro Muto, 112-6 Futawa-cho, Funabashi-shi, Chiba, Japan

[21] Appl. No.: 659,264

[22] Filed: Oct. 10, 1984

[30] Foreign Application Priority Data

Oct. 15, 1983 [JP] Japan ................................ 58-193192

[51] Int. Cl.⁴ .............................................. B26B 7/00
[52] U.S. Cl. ....................................... 30/276; 56/12.7
[58] Field of Search .................. 30/276, 347; 56/12.7, 56/295; 192/105 B, 103 A, 48.1, 89 A, 89 W

[56] References Cited

U.S. PATENT DOCUMENTS

| 554,425 | 2/1896 | Jonsson | 192/105 B |
|---|---|---|---|
| 2,176,512 | 10/1939 | Schwarcz | 164/59 |
| 2,514,228 | 7/1950 | Dodge | 192/104 |
| 2,663,396 | 12/1953 | Wagner | 192/105 B |
| 2,678,119 | 5/1954 | Birbaum | 192/105 B |
| 2,771,721 | 11/1956 | Reiman | 51/193.7 |
| 2,854,798 | 10/1958 | De Haven | 51/193.7 |
| 3,038,675 | 2/1958 | Jost | 242/46.4 |
| 3,321,982 | 5/1967 | Maunus et al. | 74/84 |
| 3,556,271 | 1/1971 | Hilpert | 192/3.33 |
| 3,600,906 | 8/1971 | Schultz | 64/30 |
| 3,826,068 | 7/1974 | Ballas et al. | 56/12.7 |
| 3,851,499 | 12/1974 | Noguchi | 64/275 |
| 3,877,252 | 4/1975 | Kobayashi | 64/25 |
| 3,928,911 | 12/1975 | Pittinger | 30/276 |
| 3,935,749 | 2/1976 | Groves | 74/6 |
| 4,007,525 | 2/1977 | Utter | 30/276 |
| 4,024,635 | 5/1977 | Mizuno et al. | 30/276 |
| 4,035,912 | 7/1977 | Ballas et al. | 30/276 |
| 4,043,103 | 8/1977 | Lakin et al. | 56/295 |
| 4,091,536 | 5/1978 | Bartholomew | 30/276 |
| 4,101,085 | 7/1978 | Arno | 252/18 |
| 4,104,796 | 8/1978 | Sheldon | 30/276 |
| 4,134,204 | 1/1979 | Perdue | 30/276 |
| 4,151,646 | 5/1979 | Lane | 30/276 |
| 4,183,138 | 1/1980 | Mitchell et al. | 30/276 |
| 4,310,970 | 1/1982 | Euenson et al. | 30/276 |
| 4,335,510 | 1/1982 | Close et al. | 30/276 |

FOREIGN PATENT DOCUMENTS 51143160 of 0000 Japan .

OTHER PUBLICATIONS

"Chain Saw Age", May 1984, pp. 10 and 14, Simplicity Trademark of Ingenious Tanaka Brain.

Primary Examiner—Douglas D. Watts

[57] ABSTRACT

Disclosed herein is an improved filament-type trimming apparatus comprising a casing having base and rim portions, a spool having a hub portion and opposite flanges, at least one filament wound on the spool and a cover adapted to support the spool within the casing. The spool is adapted to be moved radially inwardly and outwardly by reason of centrifugal force generated responsive to the speed of rotation of the casing. Upon such movement, when the spool rotates independently of the casing and the cover, additional filaments are automatically fed out. The feeding of additional filaments may be stopped when the spool is in engagement with either the casing or the cover.

14 Claims, 5 Drawing Figures

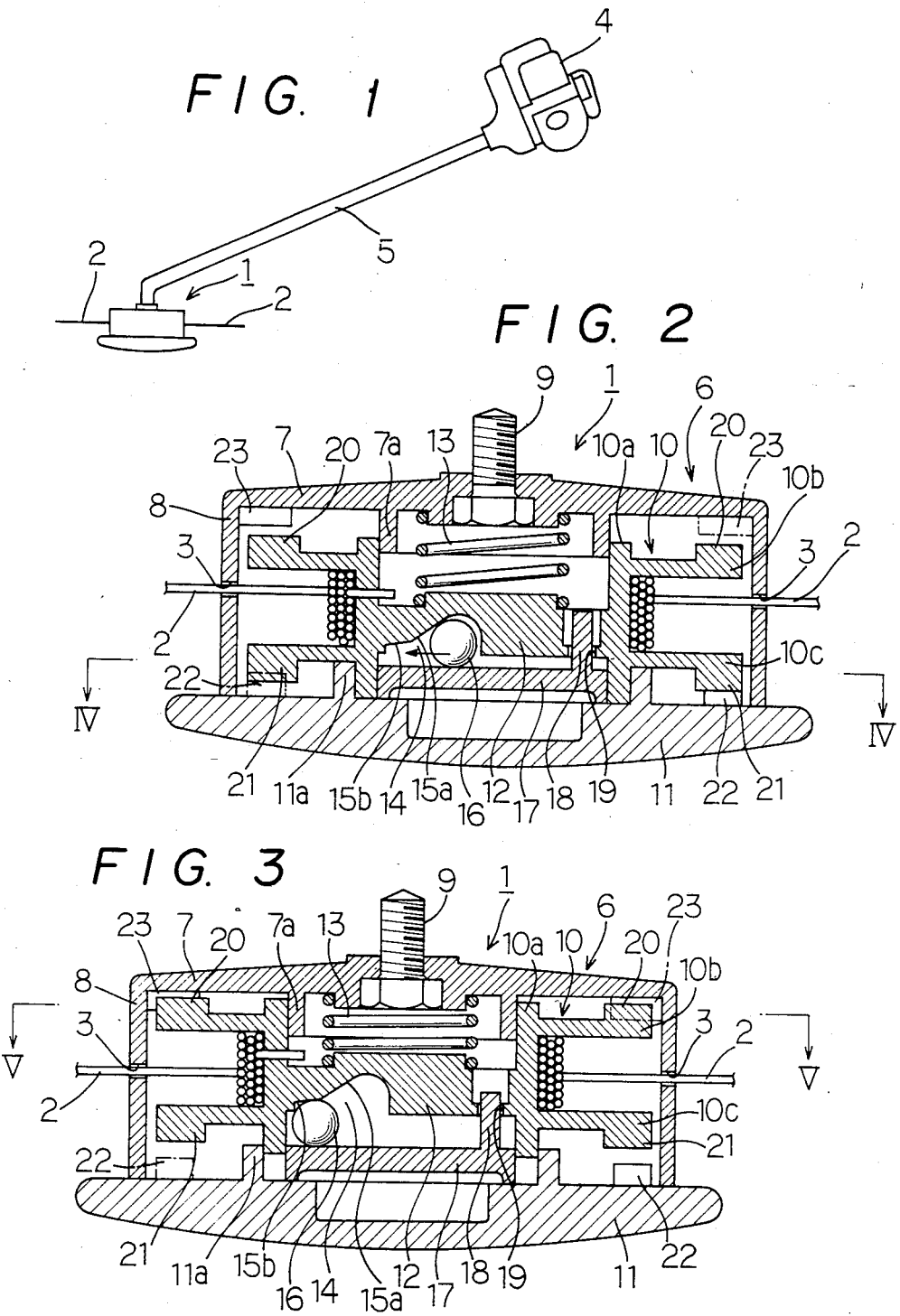

FILAMENT-TYPE TRIMMING APPARATUS

BACKGROUND OF THE INVENTION

The present invention relates to trimming apparatus which cut vegitation such as grass and weeds and more particularly, to a filament-type trimming apparatus of the type which automatically feeds out additional filaments by reason of centrifugal force generated responsive to the speed of rotation of a casing.

Trimming apparatus of this kind generally require means for feeding out additional filaments when the projecting end portions of filaments are worn or broken off during its use. One of such means heretofore available is such that additional filaments are fed out by hitting the bottom of a trimming head on the ground so as to disengage a spool within a casing from a cover or bottom plate and independently rotating the same to unwind the desired amount of the filaments. However, such means is incapable of regulating the speed of rotation of the spool and the feeding amount of additional filaments. Accordingly, the filaments are, from time to time, likely to be fed more than they are necessary, thereby increasing the cutting radius of the cutting filaments while they are cutting vegetation and causing the operator to be in a dangerous operating situation.

BRIEF SUMMARY OF THE INVENTION

It is, therefore, an object of the present invention to provide a filament-type trimming apparatus which enables automatically feeding out additional filaments and securely restoring the normal length of the projecting end portions of filaments.

It is another object of the present invention to provide a filament-type trimming apparatus which is durable and simple in construction and is readily and safely maneuverable.

BRIEF DESCRIPTION OF THE DRAWINGS

These and other objects and advantages of the present invention will be more fully understood from the following detailed description taken in connection with the accompanying drawings, in which;

FIG. 1 is a side elevational view of a filament-type trimming apparatus in accordance with the present invention;

FIG. 2 is a side sectional view illustrating the principal operational components of a filament-type trimming apparatus in accordance with the present invention;

FIG. 3 is a view similar to FIG. 2, but showing a different state; and

DETAILED DESCRIPTION OF THE PREFERRED EMBODIMENTS

Figure 4:
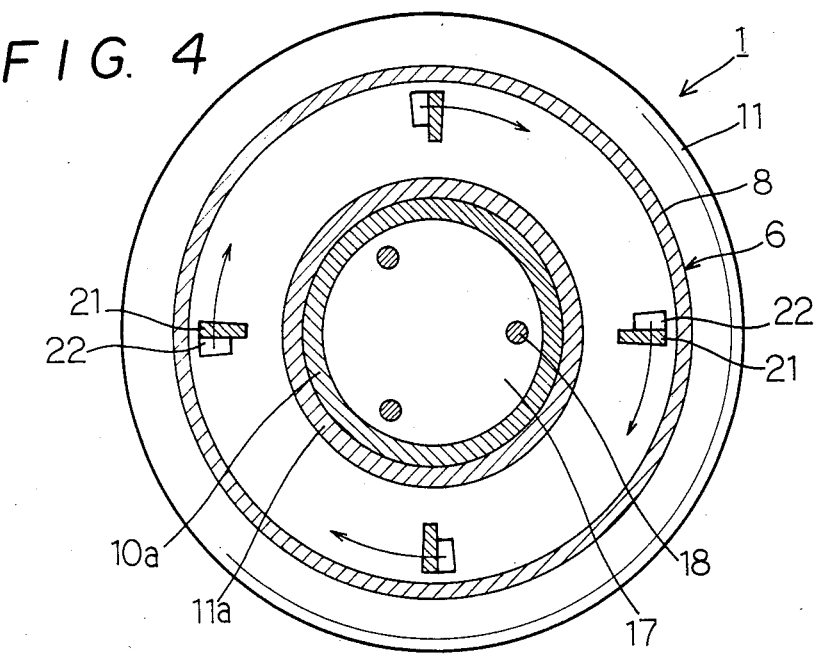
FIG. 4 is a sectional view taken along the line IV—IV of FIG. 2.

Throughout the following detailed description and drawings, like reference numerals designate like or corresponding parts shown in multiple figures of the drawings.

Referring now to the drawings and in particular, to FIG. 1, there is illustrated a filament-type trimming apparatus comprising a rotary trimming head 1 having a pair of trimming filaments 2 which project radially and outwardly through a pair of opposite apertures 3 respectively formed therein. This trimming head 1 is connected to a driving means 4 via a carrying member 5.

Referring to FIG. 2, the trimming head 1 comprises a casing 6 having a disk-like base portion 7 and a downwardly extending rim portion 8. A central outernally threaded connecting member 9 extending axially and upwardly from the base portion 7 is threadably connected for rotation by an internally threaded drive shaft (not shown) which in turn, is connected to the driving means 4 such as a gasoline internal combustion engine.

Rotatably mounted coaxially with the casing 6 is a spool 10 on which said pair of trimming filaments 2 made of synthetic resin such as nylon or the like are wound. This spool 10 carries a hub portion 10a and lower and upper flanges 10b and 10c and it is retained in the casing 6 by a cover 11 releasably mounted to the lower end of the rim portion 8 of the casing 6. Further, the spool 10 is positioned in such a manner that the lower part of the hub portion 10a is in sliding engagement with the inner peripheral surface of an annular flange 11a formed on the upper surface of the cover 11 while the upper part of the hub portion 10a is in sliding engagement with the outer peripheral surface of an annular flange 7a formed on the underside of the base portion 7 of the casing 6. Formed within the annular hub portion 10a is a central press member 12 as shown in FIG. 2. The spool 10 is pressed downwardly by means of a spring 13 provided between the underside of the base portion 7 of the casing 6 and the upper surface of this press member 12.

Radially provided at 120° intervals on the underside of the press member 12 are ball guides 14 in the form of a slot including a first inclined surface 15a and a second inclined surface 15b, the angle of inclination of the first inclined surface 15a being larger than that of the second inclined surface 15b as shown in FIG. 2 and receiving a plurality of balls 16. The balls 16 are adapted to be moved along the ball guides 14 by reason of centrifugal force applied there to responsive to the speed of rotation of the casing 6, constituting a spool engaging and disengaging mechanism with said ball guides 14. Further, these balls 16 are supported on a disk-like supporting member 17 provided coaxially on the upper surface of the cover 11. As shown in FIG. 2, this supporting member 17 is formed with a plurality of upwardly projecting pins 18 adapted to be inserted into holes 19 formed near the peripheral edge of the press member 12. In this manner, the press member 12 is in sliding engagement with these pins 18 whereby the supporting member 17 is rotated together with the spool 10.

In accordance with one embodiment of the present invention, a plurality of upwardly extending projections 20 and downwardly extending projections 21 are provided at 90° intervals on the upper flange 10b and the lower flange 10c of the spool 6 respectively. Further, a plurality of upwardly extending projections 22 are formed on the upper surface of the cover 11 so as to be in engagement with the projections 21 when the spool 10 is pressed downwardly by the action of the spring 13 as shown in FIG. 2. On the other hand, a plurality of downwardly extending projections 23 are formed on the underside of the base portion 7 of the casing 6 so as to be in engagement with the projections 20 when the spool 10 is pressed upwardly against the action of the spring 13 as shown in FIG. 3.

In use and operation of the trimming apparatus thus constructed in accordance with the present invention, when the rotary trimming head 1 is rotated by means of the driving means 4 at a speed lower than a predetermined speed, the press member 12 is adapted to be pressed downwardly by means of the spring 13. In this state, the projections 21 of the lower flange 10c of the spool 10 are in engagement with the corresponding projections 22 of the cover 11 as shown in FIG. 2. Accordingly, the spool 10 rotates with the casing 6 and the cover 11 while maintaining an constant length of the filaments 2 respectively projecting radially and outwardly from the casing 6 through the corresponding apertures 3.

When additional filaments need be supplied as a result of the projecting end portion of each of the filaments 2 being worn or broken off during its use, the feeding of additional filaments may be obtained by increasing the speed of rotation of the casing 6. That is, when the speed of rotation of the spool 10 increases, the balls 16 are moved radially outwardly along the first inclined surface 15a of the ball guides 14 as a result of which centrifugal force is applied thereto. In this state, the press member 12 is pressed upwardly against the action of the spring 13, thereby disengaging the projections 21 of the lower flange 10c of the spool 10 from the projections 22 of the cover 11. Accordingly, the spool 10 rotates independently of the casing 6 and the cover 11 and the speed of rotation of the spool 10 becomes greater than that of the casing 6 and the cover 11 as a result of centrifugal force acting on the projecting end portions of the filaments 2, thereby feeding out additional filaments.

Figure 5:
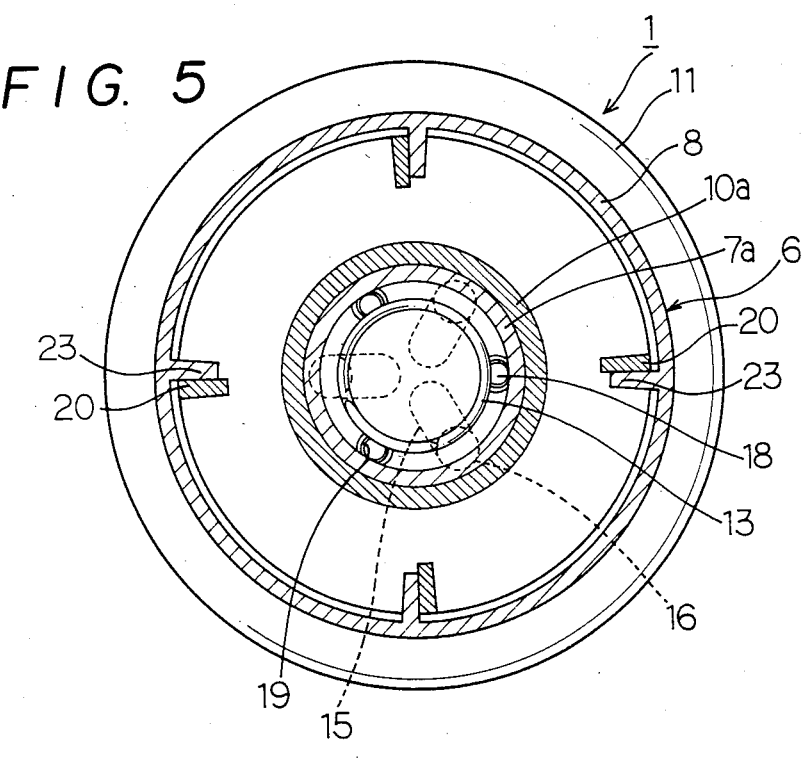
FIG. 5 is a sectional view taken along the line V—V of FIG. 3.

Then, when the balls 16 are positioned at the second inclined surface side as shown in FIG. 3 and the spool 10 is rotated at 90°, the projections 20 of the upper flange 10b of the spool 6 is brought into engagement with the projections 23 of the base portion 7 of the casing 6 as shown in FIGS. 3 and 5 whereby the spool 10 again rotates together with the casing 6 at the same speed, thereby stopping the feeding of the additional filaments from the spool 10.

When the speed of rotation of the casing 7 decreases, the balls 16 are moved radially inwardly along the ball guides 14 whereby the press member 12 is pressed downwardly by the action of the spring 13. Accordingly, the projections 20 of the upper flange 10b of the spool 10 is disengaged from the projections 23 of the base portion 7 of the casing 6 and thus, the spool 10 rotates independently of the casing 6 and the cover 11, thereby again feeding additional filaments.

Subsequently thereafter, when the balls 16 are positioned substantially near the center of the press member 12 (See FIG. 2) and the spool 10 is rotated at another 90°, the projections 21 of the lower flange 10c of the spool 10 is again brought into engagement with the projections 22 of the cover 11 as shown in FIGS. 2 and 4 whereby the spool 10 rotates together with the casing 6 and the cover 11, thereby stopping the feeding of the additional filaments from the spool 10.

While there has been described what is at present considered to be the preferred embodiment of the invention, it will be understood that many other changes and modifications may be made without departing from the spirit and scope thereof.

What is claimed is:

1. In a filament-type trimming apparatus comprising a casing having a base portion and a rim portion, a spool having a hub portion and upper and lower flanges, at least one filament wound on said spool and a cover releasably mounted to the lower end of the rim portion of the casing and adapted to support the spool, the improvements comprising:

a first engaging means for engaging the upper flange of the spool with the underside of the base portion of the casing when the spool is pressed upwardly against the action of a spring, a second engaging means for engaging the lower flange of the spool with the upper surface of the cover when the spool is pressed downwardly by the action of the spring, and a spool engaging and disengaging mechanism including a plurality of radially outwardly extending inclined ball guides in the form of a slot formed on the underside of a press member of the spool and a corresponding plurality of balls adapted to be moved along said ball guides by reason of centrifugal force generated responsive to the speed of rotation of the casing.

2. The apparatus of claim 1, wherein said balls in the spool engaging and disengaging mechanism are moved radially outwardly along the ball guides by reason of centrifugal force generated when the casing is rotated at a speed higher than a predetermined speed whereby the press member of the spool is pressed upwardly by the balls against the action of the spring.

3. The apparatus of claim 1, wherein said balls in the spool engaging and disengaging mechanism are moved radially inwardly along the ball guides when the casing is rotated at a speed lower than a predetermined speed whereby the spool is pressed downwardly by the action of the spring.

4. The apparatus of claim 1, wherein each of said ball guides in the spool engaging and disengaging mechanism is formed with first and second inclined surfaces, the angle of inclination of the first inclined surface being larger than that of the second inclined surface.

5. The apparatus of claim 1, wherein said ball guides are radially arranged at 120° intervals on the underside of the press member of the spool.

6. The apparatus of claim 1, wherein a plurality of upwardly extending projections and downwardly extending projections are formed on the upper flange of the spool and the underside of the base portion of the casing respectively, said projections of the upper flange of the spool being brought into engagement with said projections of the base portion of the casing when the spool is pressed upwardly against the action of the spring.

7. The apparatus of claim 6, wherein said upwardly extending projections and downwardly extending projections are radially arranged at 90° intervals on the upper flange of the spool and the underside of the base portion of the casing respectively.

8. The apparatus of claim 1, wherein a plurality of downwardly extending projections and upwardly extending projections are formed on the underside of the lower flange of the spool and the upper surface of the cover, said projections of the lower flange of the spool being brought into engagement with said projections of the cover when the spool is pressed downwardly by the action of the spring.

9. The apparatus of claim 8, wherein said downwardly extending projections and said upwardly extending projections are radially arranged at 90° intervals on the underside of the lower flange of the spool and the upper surface of the cover respectively.

10. The apparatus of claim 2 wherein each of said ball guides in the spool engaging and disengaging mechanism is formed with first and second inclined surfaces, and angle of inclination of the first inclined surface being larger than that of the second inclined surface.

11. The apparatus of claim 3, wherein each of said ball guides in the spool engaging and disengaging mechanism is formed with first and second inclined surfaces, the angle of inclination of the first inclined surface being larger than that of the second inclined surface.

12. The apparatus of claim 11, wherein said ball guides are radially arranged at 120° intervals on the underside of the press member of the spool.

13. The apparatus of claim 2, wherein said ball guides are radially arranged at 120° intervals on the underside of the press member of the spool.

14. The apparatus of claim 3, wherein said ball guides are radially arranged at 120° intervals on the underside of the press member of the spool.

* * * * *

UNITED STATES PATENT AND TRADEMARK OFFICE
CERTIFICATE OF CORRECTION

PATENT NO. : 4,566,189
DATED : January 28, 1986
INVENTOR(S) : G. MUTO

It is certified that error appears in the above-identified patent and that said Letters Patent is hereby corrected as shown below:

ON THE TITLE PAGE:

Insert "Assignee" data as follows:

--Assignee: Tanaka Kogyo K.K., Narashino-shi, Chiba, Japan--

Signed and Sealed this

Twenty-eighth Day of April, 1987

Attest:

DONALD J. QUIGG

Attesting Officer

Commissioner of Patents and Trademarks